United States Patent [19]

Roche

[11] Patent Number: 5,293,745
[45] Date of Patent: Mar. 15, 1994

[54] FLUID POWER REGENERATOR

[75] Inventor: Richard M. Roche, Gresham, Oreg.

[73] Assignee: Roche Engineering Corporation, Portland, Oreg.

[21] Appl. No.: 85,510

[22] Filed: Jun. 30, 1993

Related U.S. Application Data

[62] Division of Ser. No. 782,162, Oct. 24, 1991.

[51] Int. Cl.$^5$ .............................................. F16D 31/02
[52] U.S. Cl. ............................................................ 60/419
[58] Field of Search ............... 60/368, 387, 419, 413, 60/414, 464, 468, 494

[56] References Cited

U.S. PATENT DOCUMENTS

| | | |
|---|---|---|
| 986,780 | 3/1911 | Sundh . |
| 1,156,818 | 10/1915 | Rich . |
| 2,023,524 | 12/1935 | Heaton . |
| 2,060,220 | 11/1936 | Kennedy . |
| 2,257,108 | 9/1941 | Cornwell . |
| 2,370,526 | 2/1945 | Doran . |
| 2,374,588 | 4/1945 | Doran . |
| 2,549,989 | 4/1951 | Simonds . |
| 2,616,259 | 11/1952 | Quintilian . |
| 2,839,889 | 6/1958 | McGill . |
| 2,933,897 | 4/1960 | Toutant . |
| 3,038,312 | 6/1962 | Marsh . |
| 3,039,266 | 6/1962 | Schenkelberger . |
| 3,129,781 | 4/1964 | Stein . |
| 3,203,185 | 8/1965 | Williams . |
| 3,401,520 | 9/1968 | Dineen . |
| 3,443,379 | 5/1969 | Weisenbach . |
| 3,702,642 | 11/1972 | Greene . |
| 3,922,854 | 12/1975 | Coeurderoy . |
| 3,964,260 | 6/1976 | Williams et al. . |
| 3,989,117 | 11/1976 | Hill . |
| 4,087,968 | 5/1978 | Bianchetta . |
| 4,199,943 | 4/1980 | Hunt . |
| 4,245,964 | 1/1981 | Rannenberg . |
| 4,381,904 | 5/1983 | Kyte et al. . |
| 4,561,341 | 12/1985 | Aikawa . |
| 4,693,080 | 9/1987 | Van Hoof ........................ 60/414 |
| 4,712,376 | 12/1987 | Hadank et al. . |

FOREIGN PATENT DOCUMENTS 46256 3/1983 Japan .

OTHER PUBLICATIONS

"Technical update on hydraulic pumps and meters," from *Hydraulics & Pneumatics*, Oct. 1987, pp. 61–74.
"Regenerative Circuits," from *Design Engineers Handbook*, pp. b-29-b-31, (Parker -Hannifin, Publ.-1973).
"Variable Delivery from a gear pump," from *Design Engineers* Handbook, pp. i-21-i-24.
*Hydraulic Control Systems*, by Herbert E. Merritt, pp. 334–341 in Chapter 12.
John S. Barnes Corporation Advertisement for Rotary Flow Dividers (D-Series).
"Double cylinder speed with a flow divider" by Edgar Trinkel, Jr., *Hydraulics & Pneumatics*, Mar. 1986, p. 18.

*Primary Examiner*—Edward K. Look
*Assistant Examiner*—F. Daniel Lopez
*Attorney, Agent, or Firm*—Eugene Stephens & Associates

[57] ABSTRACT

A regenerator for a fluid power system is arranged to control flow rates while converting pressure drops accompanying resulting changes in flow rates into useful work. A gang of displacers are incorporated into a fluid flow network that also includes an array of selectable flow paths through the displacers. A control system, responsive to changes in demand for the flow of fluid, selects among the flow paths to operate the displacers in various combinations as motors, pumps, and recirculators for dividing the flow of fluid into two variably sized portions. One portion of the flow is sized to match the demand for fluid flow, and the other portion of the flow is converted into useful work.

13 Claims, 7 Drawing Sheets

FLUID POWER REGENERATOR

RELATED APPLICATIONS

This application is a divisional of copending parent application Ser. No. 782,162, filed 24 October 1991, entitled FLUID POWER REGENERATOR. The parent application is hereby incorporated by reference.

TECHNICAL FIELD

My invention relates to the field of fluid power systems and, in particular, to such systems incorporating fixed displacement pumps or motors.

BACKGROUND

Most energy losses from fluid power systems occur as a result of decreases in fluid pressure that do not accomplish useful work. Such pressure drops dissipate energy expended to pressurize the fluid in the form of heat.

For example, fixed displacement pumps are generally sized to meet a maximum system demand for a rate of fluid flow at a given pressure even though the maximum demand occurs only rarely. Any portion of the pressurized flow that is not required to meet a particular demand is exhausted to a return side of the fluid system by a pressure control relief valve, whose primary function is to limit system pressure. A product of the volume of exhausted fluid and its drop in pressure equals the amount of energy that is lost through the relief valve.

Similar energy losses are associated with fixed displacement motors that convert fluid power in the form of flow rate and pressure into mechanical power in the form of rotational speed and torque. Flow control valves, whose primary function is to control flow rate, are often used as throttle valves to regulate the rotational speed of fixed displacement motors. However, if a pressure drop across the motor (corresponding to a particular output torque of the motor) is less than the system pressure, then a second pressure drop equal to the difference pressure occurs across the throttle valve. The amount of energy lost is equal to a product of the volume of fluid passing through the throttle valve and the drop in pressure across the valve.

Many different approaches have been taken to minimize energy losses associated with fixed displacement pumps and motors. One approach to minimizing such energy losses is to control the rotational speed of a prime mover driving the fixed displacement pump as a function of system pressure. Electrical energy used to power an electric motor as the prime mover is saved by reducing the rotational speed of the electric motor in response to an increase in system pressure. However, this approach has been limited mainly to small electric motors as prime movers, because large electric motors are more difficult to operate efficiently at varying speeds and react much more slowly to desired changes in speed.

Another approach to energy savings with fixed displacement pumps and motors has been to replace single fixed displacement pumps and motors with respective gangs of smaller fixed displacement pumps and motors having the same total displacement. For example, U.S. Pat. No. 4,199,943 to Hunt discloses a fluid pumping system in which a gang of fixed displacement pumps are driven in unison by a prime mover. The pumps draw fluid from a common reservoir and output the fluid through respective diverter valves to either a motor supply line or the reservoir. The diverter valves are biased into positions that connect each of the pumps to the motor supply line. However, the diverter valves are controlled to successively divert the pump output flow to the reservoir in response to pressure increases in the motor supply line.

U.S. Pat. No. 4,245,964 to Rannenberg saves energy in a similar manner by mechanically connecting a pair of fixed displacement pumps to a common prime mover and deactivating one of the pumps in response to an increase in system pressure. However, instead of exhausting output flow from the deactivated pump to a reservoir, the output flow is recirculated through the deactivated pump so that there is no pressure differential across the pump.

The pumping systems of both Hunt and Rannenberg can be used to save energy by better matching power demands on the prime mover with power expended by the fluid power system to accomplish useful work. More particularly, both systems save energy by better matching the effective displacements of their pump systems to demands for fluid flow at given pressures. However, the effective displacements of their pump systems can be varied only by large increments, and power is wasted when the demand for fluid flow cannot be exactly matched by the available increments of displacement.

Fluid transmissions have also been arranged in a similar manner to conserve power. For example, U.S. Pat. No. 986,780 to Sundh and U.S. Pat. Nos. 2,370,526 and 2,374,588 to Doran disclose fluid transmissions in which respective gangs of fixed displacement motors are connected to common output shafts. Each of the transmissions includes a fixed displacement pump that provides a source of fluid flow to the gang of motors and one or more valves that provide for successively connecting the motors to the fluid flow. Output torque of the transmission increases and output rotational speed decreases as more of the motors are connected.

Although such fluid transmissions are operable over a wide range of output speeds while delivering most of the available fluid power to a load, the actual output speed must be controlled by other means. However, if the output speed is controlled (e.g., by limiting the flow rate through the transmission with a throttle valve), then less than all of the available fluid power may be delivered by the transmission (e.g., the pressure drop across the transmission is less than the system pressure) and the unused power may be wasted. In other words, energy losses from transmissions including respective gangs of fixed displacement motors are similar to losses from individual fixed displacement motors when less than all of the available fluid power is delivered by the transmissions or individual motors.

The attempts to reduce energy losses from fluid power systems also include replacing fixed displacement pumps and motors with variable displacement pumps and motors. However, with respect to fixed displacement pumps and motors, variable displacement pumps and motors are larger, more expensive, less reliable, and more sensitive to fluid contaminants; require more maintenance; and are subject to catastrophic failure that can do far-ranging damage to the fluid system in which they are used. Fixed displacement pumps and motors, such as gear pumps and motors, wear in a very gradual and predictable manner that is easily monitored by their performance in conducting routine maintenance or replacement.

Variable displacement pumps and motors have also been used to supplement operations of fixed displacement pumps and motors to reduce energy losses. For example, U.S. Pat. No. 3,038,312 to Marsh discloses a hydrostatic transmission in which a device operable as either a variable displacement pump or a variable displacement motor is mechanically coupled to a fixed displacement pump driven by a prime mover. As a pump, the variable displacement device supplements the operation of the fixed displacement pump by delivering variable amounts of additional flow to a fixed displacement motor. However, when the motor's demand for fluid flow is less than the output flow of the fixed displacement pump, the variable displacement device is operated as a motor that receives variable amounts of the flow from the fixed displacement pump and contributes to the pump's rotation.

The variable displacement device of Marsh operating as a motor replaces a conventional throttle valve interrupting a motor by-pass line for controlling the rotational speed of a fixed displacement motor in a hydrostatic transmission. That is, the variable displacement device (motor) of Marsh provides a conventional throttling function, but also converts a pressure drop across the variable displacement motor into useful work by turning the fixed displacement pump. Energy reclaimed from the pressure drop is used to reduce input power demands of the prime mover. The use of a pressure drop, which would otherwise result in a loss of energy from a fluid system, to accomplish useful work is referred to as "regeneration".

A similar type of regeneration is achieved in a hydrostatic transmission disclosed in U.S. Pat. No. 3,203,185 to Williams by replacing a counterbalance pressure control valve in a return line of the transmission with a variable displacement pump. Ordinarily, such a counterbalance valve would be used to maintain a predetermined backpressure in the return line to prevent variations in a load from overdriving an output shaft of the transmission. However, a pressure drop across the counterbalance valve dissipates a large amount of energy required to pressurize the fluid as heat.

In place of the counterbalance valve, Williams connects the variable displacement pump between an output port of a fixed displacement motor that drives the transmission output shaft and an input port of a fixed displacement pump that provides a source of fluid flow. The variable displacement pump is driven by the fixed displacement motor through a common mechanical connection with the output shaft, and the pump's displacement is varied to maintain a predetermined pressure in the return line to the fixed displacement pump. The pressurized fluid in the return line provides the fixed displacement pump with a supply of fluid that reduces the amount of energy required by the fixed displacement pump to raise the pressure of the fluid to system pressure. In other words, the differential pressure across the fixed displacement pump is reduced by the backpressure.

U.S. Pat. No. 2,549,989 to Simonds discloses a multiple motor fluid transmission system that also achieves regenerative effects by coupling variable displacement devices to each of three fixed displacement motors. A primary variable displacement pump driven by a prime mover provides a supply of fluid at a constant pressure to each of the fixed displacement motors and to each of the variable displacement devices that are respectively coupled to the motors.

When a load exceeds the torque capacity of one of the motors, the associated variable displacement device is arranged to function as a motor for supplementing the torque output of the fixed displacement motor. However, when the torque capacity of one of the motors exceeds the requirements of a load, the associated variable displacement device is arranged to function as a pump for using the excess capacity of the fixed displacement motor to add to the supply of pressurized fluid. In other words, if the pressure drop across one of the fixed displacement motors is less than the system pressure, the remaining pressure is used to drive a variable displacement pump that returns part of the flow from the motor to system pressure. The increased flow of pressurized fluid reduces the demand for fluid flow from the primary variable displacement pump supplying the system.

The regenerative fluid systems of Marsh, Williams, and Simonds save energy by using variable displacement devices in place of throttle valves or relief valves for converting pressure drops in their systems into useful work. Although possibly smaller than stand-alone variable displacement pumps and motors, the known variable displacement devices that are mechanically connected to fixed displacement pumps or motors for regenerative purposes have the same disadvantages as stand-alone variable displacement pumps and motors. Accordingly, the known regenerative systems have limited practical applications.

SUMMARY OF INVENTION

My invention, which may be generally referred to as a "fluid power regenerator", involves a gang of at least two displacers that are incorporated into a fluid flow network to at least partially replace the functions of valves or other devices for regulating pressure or flow rate in fluid power systems. The displacers, which are individually operable as fixed displacement pumps or motors, control flow rate while converting pressure drops accompanying resulting changes in the flow rate into useful work.

The displacers are mechanically connected to each other for displacing respective portions of a flow of fluid and are incorporated into a fluid flow network that also includes an array of selectable flow paths through the displacers. A control system, responsive to changes in demand for the flow of fluid, selects among the flow paths to transform varying portions of the flow of fluid into mechanical power conveyed between the displacers.

The fluid flow network divides the flow of fluid into two portions. One portion of the flow of fluid is at least approximately sized to match a particular demand for the flow of fluid. The other portion of the flow of fluid is managed so that any pressure drop accompanying the division of the flow of fluid is converted into useful work. For example, excess flow of fluid is transformed into mechanical power by using the excess flow to drive at least one of the displacers as a motor. The mechanical power generated by one of the displacers operating as a motor is used to drive at least one other of the displacers as a pump.

My fluid power regenerator is especially suitable for use in conjunction with fixed displacement pumps or motors or in place of variable displacement pumps and motors. Each of these uses has at least one different basic configuration. A first of the basic configurations is used in conjunction with a fixed displacement pump, and a second of the basic configurations is used as a replacement for a variable displacement pump. Both the first and the second basic configurations of my regenerator limit system pressure by exhausting excess fluid flow to a return side of the system. A third of the basic configurations is used in conjunction with a fixed displacement motor or similar actuator (e.g., piston actuator), and a fourth of the basic configurations is used as a replacement for a variable displacement motor. Both the third and fourth basic configurations exhaust excess fluid flow to control output speed or torque (or force) imparted to a load by a motor (or other actuator). However, all four of the basic configurations convert the excess flow into useful work before exhausting the excess flow to a reservoir or other store of fluid including a return side of the fluid power system.

The first basic configuration of my fluid regenerator is arranged with a gang of displacers that are mechanically interconnected with each other for dividing a flow of fluid from a fixed displacement pump into predetermined proportions. The displacers are incorporated into a fluid flow network that includes: a first pressure line for connecting respective input ports of the displacers to an output port of the fixed displacement pump, a second pressure line for connecting respective output ports of the displacers to a load, and a return line for connecting the output port of one or more of the displacers to a reservoir (or return side of the fluid system). A control system, responsive to a reduced demand for the flow of fluid in the second pressure line, provides for diverting fluid flowing out of the one or more displacers from the second pressure line to the return line.

The displacers interconnecting the first pressure line and the return line function as motors, and other of the displacers interconnecting the first and the second pressure lines function as pumps. The displacers operating as motors transform a portion of the flow of fluid that is not required to satisfy the demand for fluid flow to the load into mechanical power that is used to drive the other displacers as pumps. The first pressure line connects the gang of displacers in series with the fixed displacement pump, and the displacers operating as pumps help to relieve demand on a prime mover driving the fixed displacement pump to more closely match the demand for fluid flow to the load.

The fluid flow network preferably includes at least three displacers (incorporated into a fluid flow network as described above) and a feedback line for connecting an output port of a third displacer to the first pressure line. The control system further provides for diverting fluid flowing out of the third displacer from the second pressure line to either the return line or the feedback line. Diverting the output flow from the third displacer to the feedback line recirculates a fixed volume of fluid through the third displacer; and this effectively removes the third displacer from the flow of fluid, which is thereafter divided among the remaining displacers. Displacers operating in a recirculating mode are hereinafter referred to as "recirculators". The choice of operating the displacers as pumps, motors, or recirculators enables my regenerator to more closely match the demand for fluid flow to the load with the demand on the prime mover required to drive the fixed displacement pump.

This configuration of my regenerator can be used to limit pressure increases in the second pressure line to the load in response to a reduced demand for fluid flow from the fixed displacement pump. The excess capacity of the fixed displacement pump is routed through the displacers to reduce pressure in the first pressure line between the fixed displacement pump and the displacers. The reduction in output pressure of the fixed displacement pump saves energy by reducing power demands on the prime mover driving the fixed displacement pump.

The second basic configuration of my regenerator (which replaces a variable displacement pump) is arranged with a gang of displacers that are mechanically interconnected with each other and with a prime mover for displacing predetermined proportions of a flow of fluid. The displacers are incorporated into a fluid flow network that includes: an intake line for connecting respective input ports of the displacers to a reservoir, a pressure line for connecting respective output ports of the displacers to a load, a feedback line for connecting the pressure line to the input port of one or more of the displacers, and a return line for connecting the output port of the one or more displacers to the reservoir. A control system, responsive to a reduced demand for fluid flow in the pressure line, provides for diverting fluid flowing into the one or more displacers from the intake lie to the feedback line and for diverting fluid flowing out of the one or more displacers from the pressure line to the return line.

The displacers interconnecting the feedback line and the return line are driven as motors for helping to drive other displacers interconnecting the intake line and pressure line as pumps. However, the one or more displacers can also be operated as recirculators by interconnecting either the intake and return lines or the feedback and pressure lines. Fluid flow through the displacers operating as either motors or recirculators reduces demand on the prime mover. The displacers operating as motors subtract from the displacement of the displacers operating as pumps. However, the displacers operating as recirculators neither add to nor subtract from the pumping displacement. The choice of operating the displacers as pumps, motors, or recirculators enables this configuration of my regenerator to more closely match demand of the load with the demand on the prime mover required to drive the gang of displacers.

The third basic configuration of my regenerator, which is used in conjunction with a fixed displacement actuator, is arranged with a gang of displacers that are mechanically interconnected with each other for dividing a flow of fluid into predetermined proportions. However, similar to a throttle valve, the fluid flow network can be arranged to control flow rates either to or from a fixed displacement actuator. For controlling flow rates to the actuator (also referred to as "meter in"), the fluid flow network includes: a first pressure line for connecting respective input ports of the displacers to a source of the fluid flow, such as a primary pump; a second pressure line for connecting respective output ports of the displacers to an input port of the actuator; and a return line for connecting the output port of one or more of the displacers to a reservoir. A control system, responsive to a signal for controlling fluid flow through the actuator, provides for diverting fluid flowing out of the one or more displacers from the pressure line to the return line.

The displacers interconnecting the first pressure line and the return line function as motors, driving other displacers interconnecting the first and the second pressure lines as pumps. The displacers operating as motors transform a portion of the fluid flow that is not required to satisfy the demand for fluid flow by the actuator into mechanical power that is used to drive the other displacers as pumps. Although any diversion of the fluid flow to the return line decreases the rate of fluid flow to the actuator, the displacers driven as pumps can be used to increase pressure in the second pressure line to the actuator with respect to system pressure in the first pressure line.

However, for controlling flow rates from the actuator (also referred to as "meter out"), the fluid flow network includes: a pressure line for connecting an input port of the actuator to a source of the fluid flow, such as a primary pump; an exhaust line for connecting an output port of the actuator to respective input ports of the displacers; a return line for connecting respective output ports of the displacers to a reservoir; and a feedback line for connecting the output port of one or more of the displacers to the pressure line. A control system, responsive to a signal for controlling fluid flow through the actuator, provides for diverting fluid flowing out of the one or more displacers from the return line to the feedback line.

The displacers interconnecting the exhaust line and the return line function as motors, and the displacers interconnecting the exhaust line and the feedback line function as pumps. The displacers operating as motors transform any remaining portion of the fluid power exhausted from the actuator into mechanical power that is used to drive the other displacers as pumps. Fluid flow from the displacers operating as pumps can be combined with the flow of fluid from the primary pump to the actuator or diverted by a so-called "power beyond" circuit to another fluid power system. An intake line connecting the input port of the actuator to the reservoir can also be added so that the gang of displacers can be controlled to extract useful work from a braking resistance to movement of the actuator. The fluid flow network can also be arranged to operate one or more of the displacers as a recirculator to provide further control over the actuator.

The fourth basic configuration of my regenerator (which replaces a variable displacement motor) is arranged with a gang of displacers that are mechanically interconnected with each other and with a load for displacing predetermined proportions of a flow of fluid. The displacers are incorporated into a fluid flow network that includes: a pressure line for connecting respective input ports of the displacers to a source of fluid flow such as a primary pump, a return line for connecting respective output ports of the displacers to a reservoir, an intake line for connecting the input port of one or more of the displacers to the reservoir, and a feedback line for connecting the output port of the one or more displacers to the pressure line. A control system, responsive to a signal for controlling fluid flow through the actuator, provides for diverting fluid flowing into the one or more displacers from the pressure line to the intake line and for diverting fluid flowing out of the one or more displacers from the return line to the feedback line.

The displacers interconnecting the pressure line and the return line function as motors, and the displacers interconnecting the intake line and the feedback line function as pumps. The displacers operating as motors drive the load as well as the other displacers operating as pumps. One or more of the displacers can also be operated as a recirculator by connecting the displacer between the intake and return lines. The control system and the fluid flow network control the operation of the displacers so that most of any fluid flow not required to drive the load is converted into useful work.

All four of the basic configurations of my regenerator are preferably arranged to include respective gangs of displacers that have different size displacers to more exactly divide a fluid flow between the portion that is sized to match a particular demand and the remaining portion that is converted into useful work. The control system enables the different size displacers to be operated in various combinations of motors, pumps, and recirculators to provide a large number of proportional changes in the division of fluid flow. For example, the displacers in each gang are preferably sized to provide a large number of useful permutations that include desired incremental divisions of the fluid flow.

More than one gang of displacers can be connected in series within the fluid flow network to adapt my regenerator to a variety of system sizes. For example, a first gang of displacers can be arranged to divide a flow of fluid into a small number of increments. A second gang of displacers can be arranged to further divide one of the increments of fluid flow through the first gang of displacers into a much larger number of increments. Thus, the total number of increments into which the fluid flow is divided is equal to a product of the numbers of increments into which the fluid is divided by the respective gangs of displacers. Different rates of fluid flow can be accommodated by replacing displacers in the first gang of displacers with different size displacers. The second gang of displacers can be standardized for use with a variety of different size fluid systems.

DRAWINGS

DETAILED DESCRIPTION

Figure 4:
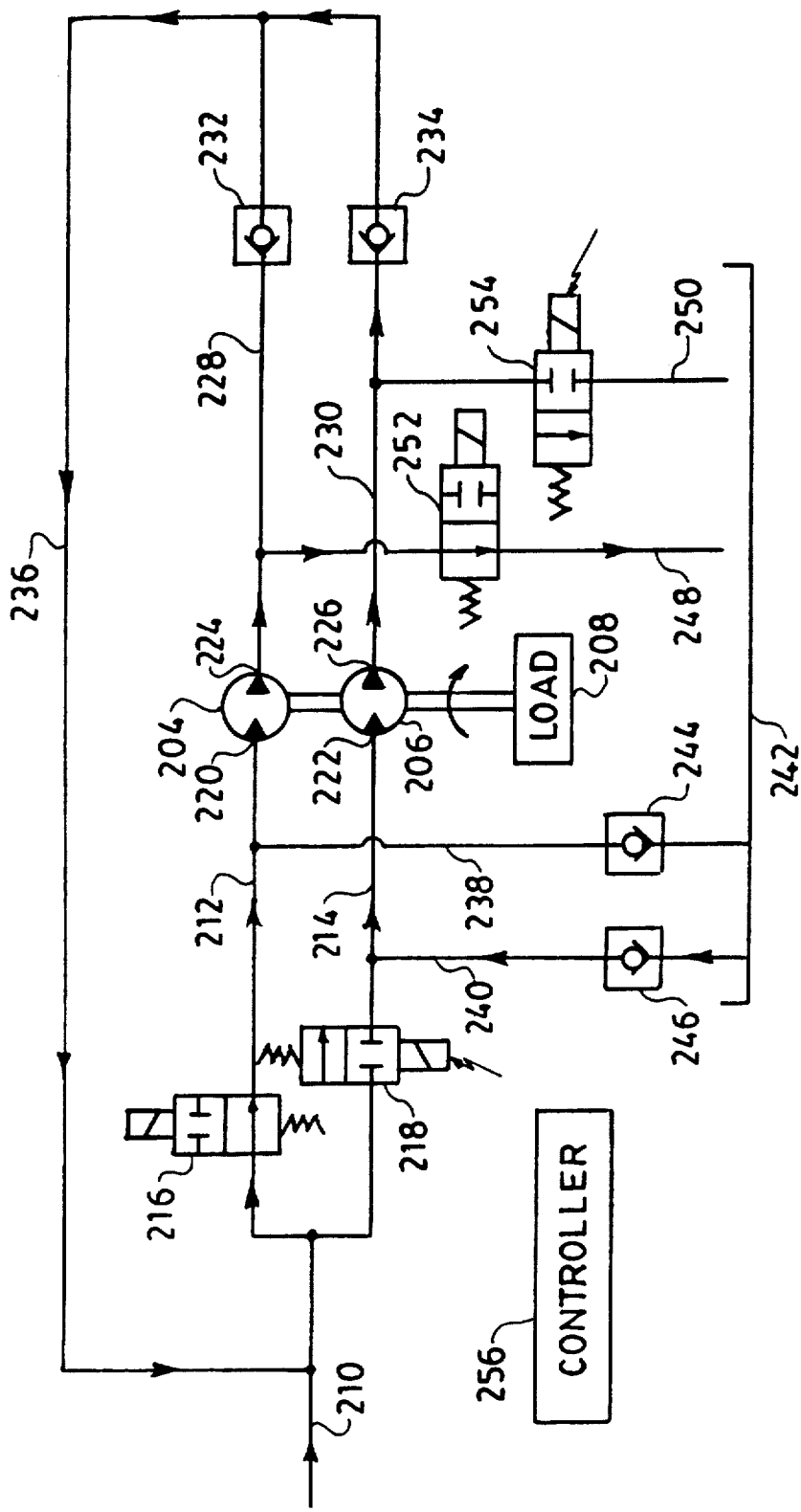
FIG. 4 is a diagram of my regenerator used as a replacement for a variable displacement motor.
Figure 5:
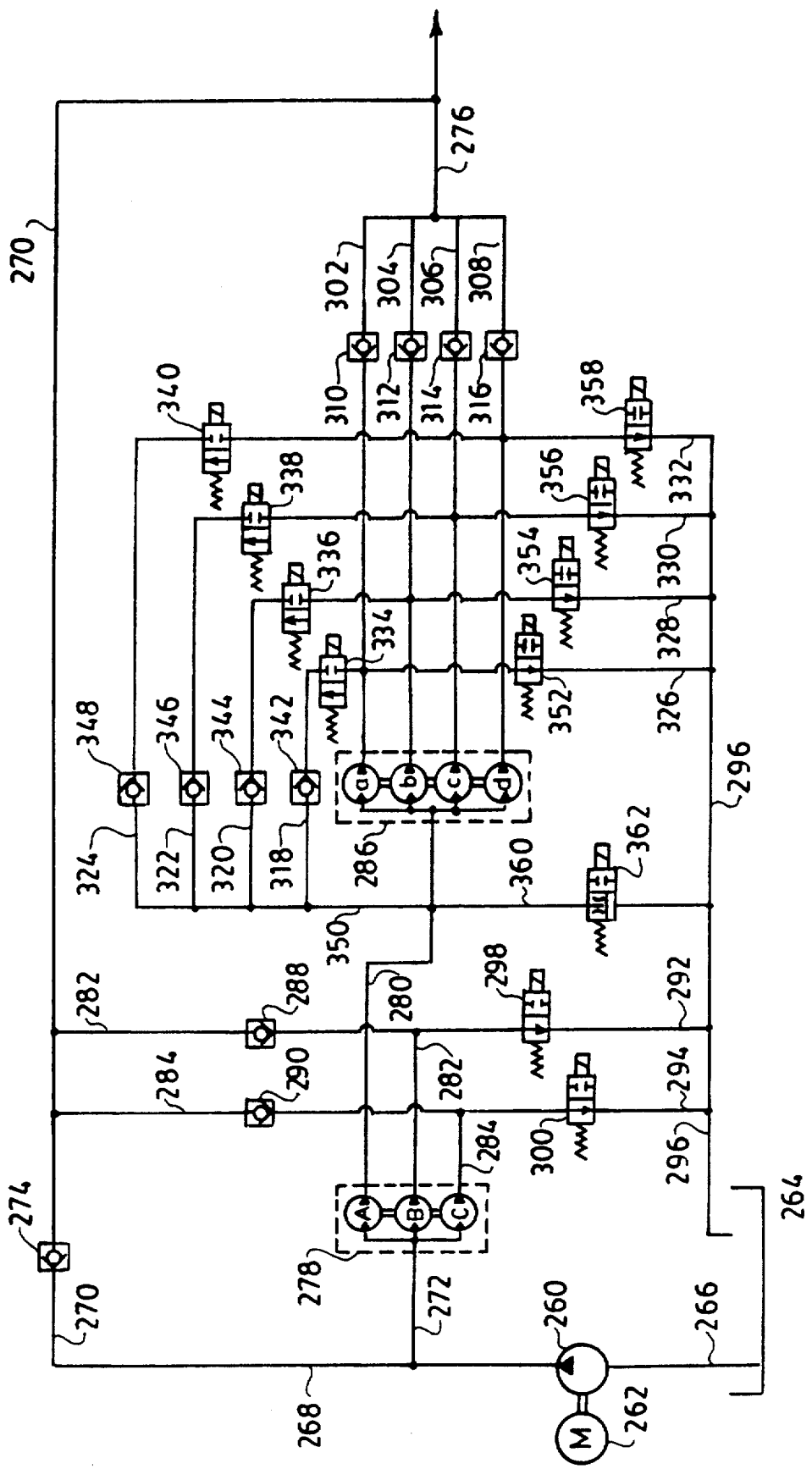
FIG. 5 is a diagram of a more detailed version of my regenerator shown in FIG. 1 including two gangs of displacers that are connected in series for adapting my regenerator to different size systems.

Although my regenerator is preferably constructed with a gang of four displacers as shown in FIG. 5, the different basic configurations of my regenerator can be more easily explained with reference to the simplified embodiments of FIGS. 1-4 in which the displacers are shown in pairs.

Figure 1:
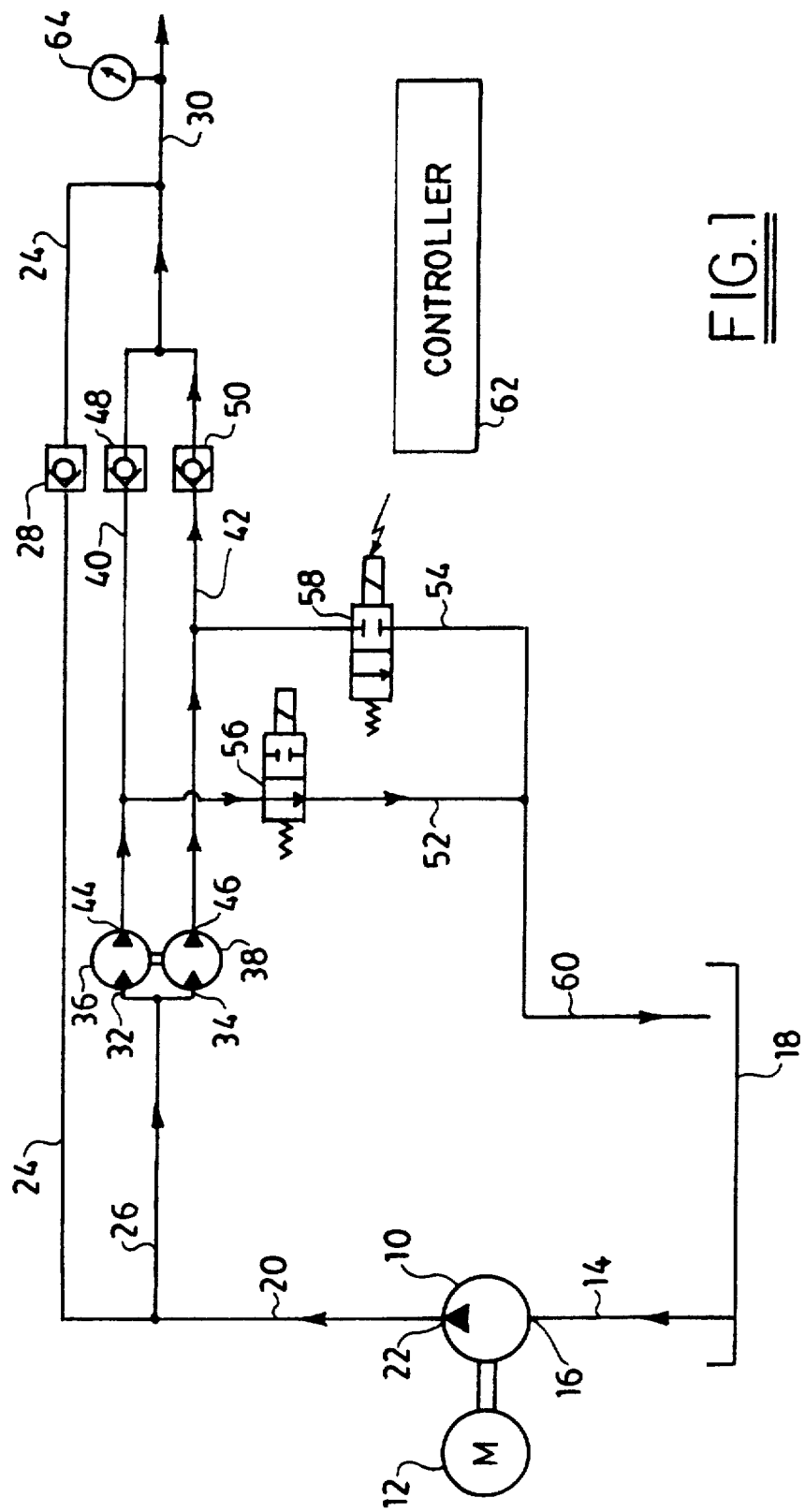
FIG. 1 is a diagram of my regenerator used in conjunction with a fixed displacement pump.

FIG. 1 illustrates my regenerator as part of a fluid pumping system for supplying a flow of fluid at a constant pressure to a load or at a differential pressure that exceeds pressure requirements of the load by a constant amount. The system includes a fixed displacement pump 10 driven by a prime mover 12 such as an electric motor. An intake line 14 connects an input port 16 of pump 10 with a vented reservoir 18. A primary pressure line 20, extending from an output port 22 of the pump 10, branches into two secondary pressure lines 24 and 26 that form the beginnings of a fluid flow network of my regenerator.

The secondary pressure line 24 extends through a check valve 28 to a system output line 30 for supplying a flow of fluid to a load (not shown). The secondary pressure line 26 connects the primary pressure line 20 to respective input ports 32 and 34 of displacers 36 and 38, which are rotatively coupled to each other. The displacers 36 and 38 are preferably fixed displacement gear drives that can be used as either pumps or motors.

Tertiary pressure lines 40 and 42 connect respective output ports 44 and 46 of the displacers 36 and 38 to the system output line 30 through respective check valves 48 and 50. Secondary return lines 52 and 54, interrupted by respective shutoff valves 56 and 58, connect the respective tertiary pressure lines 40 and 42 to a primary return line 60 that empties into reservoir 18. The shutoff valves 56 and 58 are biased to open positions (as a protection against system damage accompanying an electrical failure) but can be switched to closed positions by respective solenoid actuators.

Although it remains a good practice to protect the fixed displacement pump 10 with a pressure relief valve (not shown), my regenerator is intended to at least supplement operation of such a relief valve to convert its pressure relief function into useful work. A controller 62, which preferably includes a microprocessor and drivers for the solenoid actuators, can be arranged to receive information from a pressure sensor 64 for monitoring fluid pressure in the system output line 30. Instead of dumping a portion of the fluid flow directly to the reservoir 18 in response to monitored pressures that exceed a predetermined system pressure, one or the other of the shutoff valves 56 and 58 is allowed to open for routing the excess fluid flow through one of the displacers 36 and 38 before emptying the fluid into the reservoir.

For example, FIG. 1 depicts operation of my regenerator with the valve 56 in an open position and the valve 58 actuated to a closed position. Excess fluid flow is directed through the displacer 36 from the secondary pressure line 26 to the secondary return line 52 and drives the displacer 36 as a motor. Mechanical power generated by the displacer 36 operating as a motor drives the displacer 38 as a pump in series with the fixed displacement pump 10. The displacer 38 operating as a pump produces, between secondary pressure line 26 and tertiary pressure line 40, a pressure differential that reduces fluid pressure in the secondary pressure line 26 as well as in the primary pressure line 20.

The reduction in fluid pressure in the primary pressure line 20 reflects a reduction in the output pressure of the fixed displacement pump 10. Since fluid power is calculated as a product of pressure and flow rate, the reduction in output pressure of the fixed displacement pump results in a corresponding reduction in power demand on the prime mover 12. Thus, energy is saved by converting a portion of the fluid power that is not demanded by the load into a corresponding reduction in the demand on the prime mover.

Although the displacers 36 and 38 operate quite efficiently, the secondary pressure line 24 is used to by-pass the two displacers when full flow from the fixed displacement pump 10 is demanded by the load. However, when either displacer is used as a motor for driving the other as a pump, pressure in the secondary pressure line 24 is reduced with respect to pressure in the system output line 30, and the full flow from the fixed displacement pump 10 is directed through the displacers via secondary pressure line 26. The check valve 28 prevents a reversal of fluid flow in the secondary pressure line 24 from the system output line 30. The check valves 48 and 50 prevent a similar reversal of fluid flow in the respective pressure lines 40 and 42 when one of the valves 56 and 58 is opened.

Figure 2:
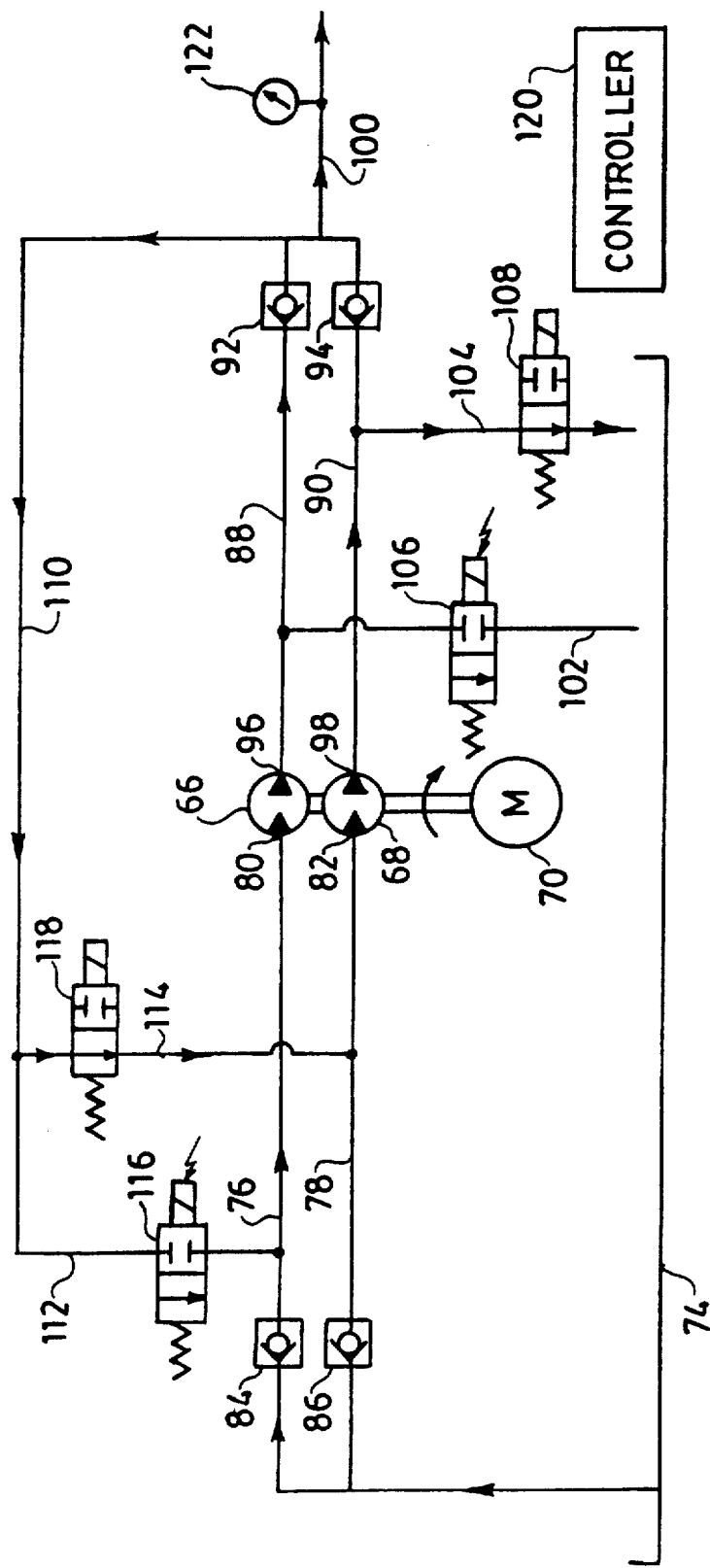
FIG. 2 is a diagram of my regenerator used as a replacement for a variable displacement pump.

FIG. 2 illustrates another example of a pumping system in which my regenerator is used to save energy. However, the primary pump of this example is formed by mechanically connecting a pair of displacers 66 and 68 to each other and to a prime mover 70. A primary intake line 72, which draws fluid from a vented reservoir 74, branches into two secondary intake lines 76 and 78 that connect to respective input ports 80 and 82 of the displacers. Check valves 84 and 86 prevent fluid in the secondary intake lines from returning to the reservoir 74.

Pressure lines 88 and 90 extend through respective check valves 92 and 94 and connect respective output ports 96 and 98 of the displacers to a system output line 100. Return lines 102 and 104, interrupted by a first pair of shutoff valves 106 and 108, connect the respective pressure lines 88 and 90 to the reservoir 74. The shutoff valves 106 and 108 are biased to open positions for reasons noted above but can be switched to closed positions by respective solenoid actuators.

A primary feedback line 110 is connected to the system output line 100 and branches into two secondary feedback lines 112 and 114 that are respectively joined to the secondary intake lines 76 and 78. A second pair of similarly operated shutoff valves 116 and 118 respectively interrupt the secondary feedback lines 112 and 114 to control fluid flow from the system output line 100 to the input port of one or the other of the displacers 66 and 68.

Controller 120 is arranged to receive information from pressure sensor 122 and to control the operating positions of the shutoff valves 106, 108, 116, and 118 for at least approximately matching output flow from the displacers to the demand for fluid flow by a load. Different combinations of the valve operating positions are used to selectively operate the displacers as pumps, motors, or recirculators for incrementally varying the collective output flow of the displacers.

For example, FIG. 2 depicts the valve operating positions that are required for operating the displacer 66 as a pump and the displacer 68 as a motor. In particular, valve 106 is closed to direct output flow from the displacer 66 to the system output line 100, and the valve 108 is open to return output flow from the displacer 68 to the reservoir 74. The valve 116 is also closed to prevent any of the output flow to the system output line 100 from being recirculated to the displacer 66, but valve 118 is open to feed back a portion of the output flow from the displacer 66 (the larger of the two displacers) to the input port 82 of the displacer 68.

Part of a pressurized flow produced by displacer 66 operating as a pump is used to drive the displacer 68 as a motor for reducing power demands on the prime mover 70. Since the displacer 68 operating as a motor is driven by part of the output flow of the other displacer 66 operating as a pump, the output flow to the load is determined by subtracting the flow through the displacer 68 from the flow through the displacer 66. The reduction in flow is converted into an energy savings in two ways. First, by not operating the displacer 68 as a pump, demand on the prime mover 70 for driving the displacers is reduced. Second, by operating the displacer 68 as a motor, a portion of the fluid power produced by the displacer 66 operating as a pump is converted into mechanical power that further reduces the demand on the prime mover to a fraction of the power required to drive the displacer 66.

Alternatively, the displacer 68 can be switched from operating as a motor to operating as a recirculator by closing either of the valves 108 and 118. If the valve 108 is closed, a constant volume of fluid is recirculated between input and output ports of displacer 68. If the valve 118 is closed instead, the displacer 68 recirculates fluid to and from the reservoir. However, closing either valve 108 or 118 increases fluid flow in the system output line 100 to the full output flow of the displacer 66. As a recirculator, operation of the displacer 68 does not add any significant demand to the prime mover 70 beyond the requirements for driving the displacer 66.

Figure 3:
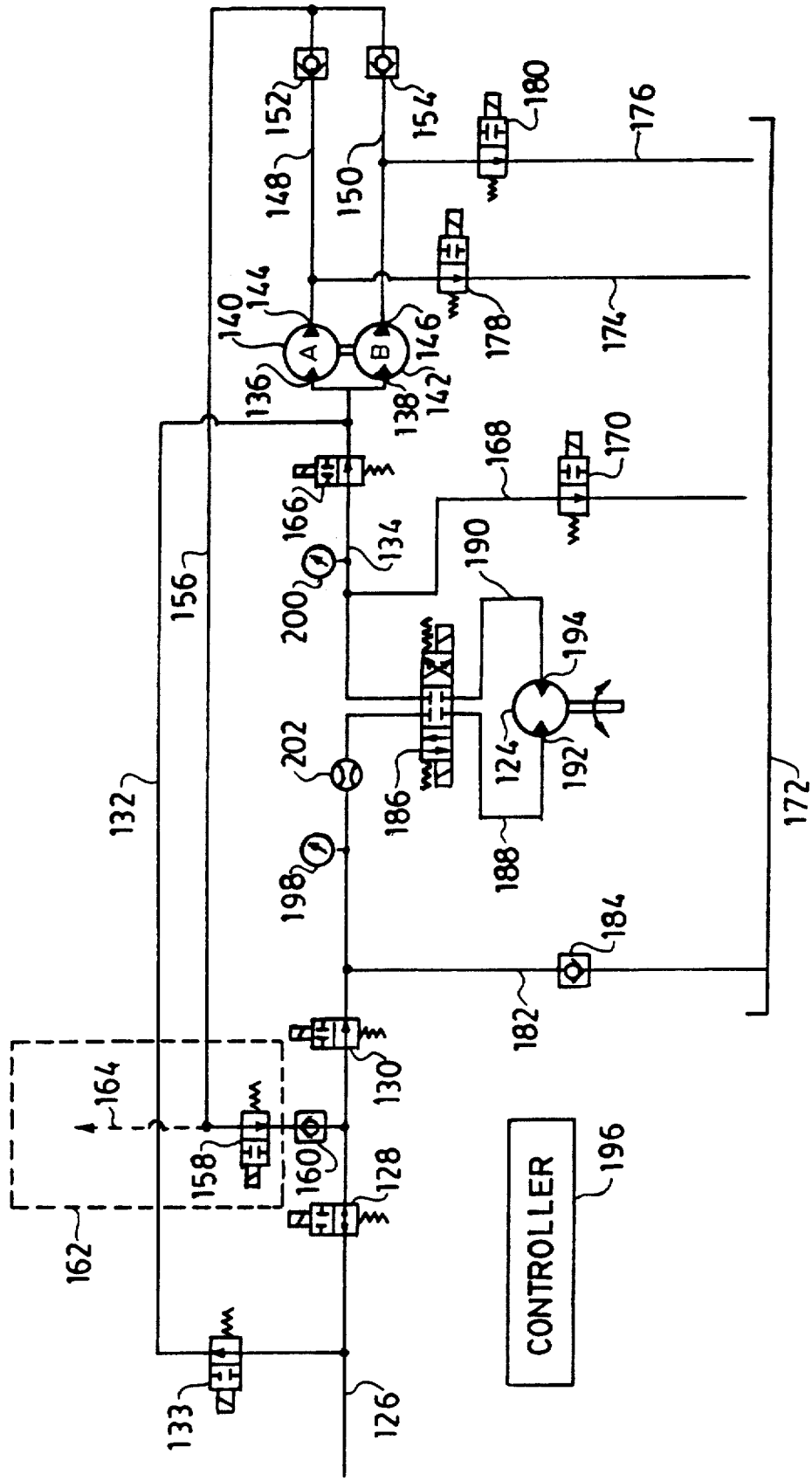
FIG. 3 is a diagram of my regenerator used in conjunction with a fixed displacement motor.

FIG. 3 is a composite illustration of several ways in which my regenerator can be used with a fluid actuator to save energy. For example, the depicted fluid flow network provides for effectively configuring the regenerator to control flow rates either into or out of the actuator. Although depicted as a fixed displacement motor 124, the actuator could also be another type of load device such as a fluid cylinder that converts fluid power into mechanical force and linear motion.

The fixed displacement motor 124 is supplied with fluid power from a pressure line 126 that extends from a source of fluid flow (not shown). Two-position valves 128 and 130 interrupt fluid flow in the pressure line 126 to the fixed displacement motor 124. An alternative pressure line 132, interrupted only by shutoff valve 133, by-passes the shutoff valves 128 and 130 and the fixed displacement motor 124 and connects to a primary exhaust line 134 of the fixed displacement motor.

The primary exhaust line 134 connects to respective input ports 136 and 138 of displacers 140 and 142, which are mechanically coupled to each other. Output ports 144 and 146 of the displacers connect to respective secondary exhaust lines 148 and 150 that extend through respective check valves 152 and 154. The two secondary exhaust lines 148 and 150 are joined together with a feedback line 156 that connects to the pressure line 126 between shutoff valve 128 and shutoff valve 130. The feedback line 156 is interrupted by both a shutoff valve 158 and a check valve 160. The shutoff valve 158 forms part of a so-called "power beyond" circuit 162 that diverts regenerated fluid power through intermediate line 164 to another actuator or fluid power system (neither of which is shown), or the fluid power could be similarly diverted to an input port of a pump (also not shown) supplying a flow of fluid to the pressure line 126. The check valve 160 prevents fluid in the pressure line 126 from reversing flow in the feedback line 156.

A shutoff valve 166 interrupts the primary exhaust line 134 between the fixed displacement motor 124 and the alternative pressure line 132. Between the fixed displacement motor 124 and the shutoff valve 166, a return line 168, interrupted by shutoff valve 170, connects the primary exhaust line 134 to a vented reservoir 172. Similarly, return lines 174 and 176, interrupted by respective shutoff valves 178 and 180, connect respective secondary exhaust lines 148 and 150 to the reservoir 172. An intake line 182 connects the reservoir 172 to a portion of the pressure line 126 between the shutoff valve 130 and the fixed displacement motor 124. Check valve 184, located along the intake line 182, prevents fluid flow to the reservoir 172.

The fixed displacement motor 124 is partly controlled by a three-position directional control valve 186 that interconnects the pressure line 126 and the primary exhaust line 134 with feed lines 188 and 190 to respective motor ports 192 and 194. The three-position valve 186 allows the fixed displacement motor to be driven in either direction.

A controller 196 is arranged to control combinations of motor rotational speed and torque as well as a degree of fluid flow resistance for braking the motor. The controller 196 receives information from pressure sensors 198 and 200 respectively located along pressure line 126 and primary exhaust line 134 and a flow rate sensor 202 also located along the pressure line 126. All of the shutoff valves shown in FIG. 3 are biased to open positions but can be switched to closed positions by respective solenoid actuators that are energized in various combinations by the controller 196.

For example, output flow from the fixed displacement motor 124 can be controlled by closing valve 133 in the alternative pressure line 132, valve 170 in the return line 168, and either one of the valves 178 and 180 in the respective return lines 174 and 176. Assuming closure of valve 180, the displacer 140 is operated as a motor by remaining fluid pressure in the primary exhaust line 134, and the displacer 142 is operated as a pump that is driven by the displacer 140. The displacer 142 operating as a pump discharges a flow of pressurized fluid into feedback line 156 that either returns the flow to pressure line 126 or diverts the flow to the power beyond circuit 162 by closing valve 158.

Fluid flow to the fixed displacement motor 124 is controlled in a similar manner by closing valve 128 in the pressure line 126, valve 166 in the primary exhaust line 134, and either one of the valves 178 and 180 in the respective return lines 174 and 176. Assuming closure of valve 180, the displacer 140 is operated as a motor by fluid pressure in the alternative pressure line 132, and the displacer 142 is operated as a pump that is driven by the displacer 140. The displacer 142 operating as a pump discharges a flow of pressurized fluid into feedback line 156 that returns the flow to pressure line 126 for driving the fixed displacement motor 124.

The arrangement of my regenerator for controlling flow from the fixed displacement motor 124 is particularly suitable for extending the usual operating range of the motor to include low torque but high rotational speed operation. For example, fluid fed back to the pressure line 126 can be used to increase the flow rate to the motor. In contrast, the arrangement of my regenerator for controlling flow to the fixed displacement motor 124 is particularly suitable for extending the usual operating range of the motor to include high torque but low rotational speed operation. For example, the portion of the fluid flow that is not returned to the pressure line 126 can be used to further pressurize the remaining fluid flow to the motor.

An arrangement of my regenerator similar to the arrangement for controlling flow from the fixed displacement motor 124 can also be used to brake the motor, while returning energy expended to brake the motor as a flow of pressurized fluid. In addition to closing the valves required to control flow from the fixed displacement motor, valve 130 in pressure line 126 is also closed to isolate the motor from the source of pressurized fluid. Momentum enables the motor to operate temporarily as a pump that draws fluid from the reservoir 172 through intake line 182. The discharge from the fixed displacement motor operating as a pump is handled in a manner similar to the arrangement for controlling flow from the fixed displacement motor. However, valve 130 prevents any of the flow fed back to the pressure line 126 from reaching the motor.

FIG. 4 illustrates another example of a motor system in which my regenerator is used to save energy. However, a motor in this example is formed by mechanically connecting a pair of displacers 204 and 206 to a load 208.

A primary pressure line 210 from a source of fluid flow (not shown) branches into two secondary pressure lines 212 and 214 that are interrupted by respective shutoff valves 216 and 218. The secondary pressure lines 212 and 214 connect to respective input ports 220 and 222 of the displacers 204 and 206. Output ports 224 and 226 of the two displacers are connected to respective exhaust lines 228 and 230 that extend through check valves 232 and 234. The two exhaust lines 228 and 230 join together with a feedback line 236 that connects to primary pressure line 210.

Intake lines 238 and 240 connect a vented reservoir 242 to the respective secondary pressure lines 212 and 214 through check valves 244 and 246. Return lines 248 and 250, interrupted by shutoff valves 252 and 254, connect the respective exhaust lines 228 and 230 to the reservoir 242.

Controller 256 is arranged to control the operating positions of the shutoff valves 216, 218, 252, and 254 for at least approximately matching the consumption of fluid power to the demand for rotational speed and torque of the load. Different combinations of the valve operating positions are used to selectively operate the displacers 204 and 206 as pumps, motors, or recirculators for incrementally varying the mechanical and fluid power output of the displacers.

For example, FIG. 4 depicts valves 218 and 254 in closed positions to operate displacer 204 as a motor and displacer 206 as a pump. The displacer 204 operating as a motor drives both the load 208 and the displacer 206 as a pump. Fluid power that is not required to drive the load 208 is used by the displacer 206 operating as a pump to draw additional fluid from the reservoir 242 and to add the additional fluid to the flow of the primary pressure line 210. Although not shown, the additional fluid flow could also be diverted to a "power beyond" circuit such as shown in FIG. 3 or to an input port of a pump supplying a flow of fluid to the pressure line 210.

A more detailed example of my regenerator used in conjunction with a fixed displacement pump is shown in FIG. 5 in which two gangs of displacers are arranged within a fluid flow network as a further development of the first basic configuration shown in FIG. 1. Similar to the earlier-described configuration, a fixed displacement pump 260 driven by a prime mover 262 draws fluid from a vented reservoir 264 through an intake line 266 and outputs a flow of fluid into a primary pressure line 268.

The fluid flow network begins with secondary pressure lines 270 and 272 that branch from the primary pressure line 268. The secondary pressure line 270 extends through a check valve 274 and connects directly to a system output line 276. The secondary pressure line 272 connects to respective input ports of a first gang of displacers 278 that are individually labeled in upper case characters "A", "B", and "C". Output ports of the same displacers are connected to respective tertiary pressure lines 280, 282, and 284 for dividing the fluid flow into predetermined proportions.

The tertiary pressure line 280 connects to respective input ports of a second gang of displacers 286 that are individually labeled in lower case characters "a", "b", "c", and "d". The other tertiary pressure lines 282 and 284 extend through respective check valves 288 and 290 and join together with the secondary pressure line 270. Secondary return lines 292 and 294 connect the respective tertiary pressure lines 282 and 284 to a primary return line 296 that empties into the reservoir 264. Shutoff valves 298 and 300 interrupt the respective secondary return lines 292 and 294 to control fluid flow from the respective tertiary pressure lines 282 and 284 to the reservoir 264.

Output ports of the second gang of displacers 286 connect to respective quaternary pressure lines 302, 304, 306, and 308 that extend through respective check valves 310, 312, 314, and 316 and join together with the system output line 276. The quaternary pressure lines 302, 304, 306, and 308 also branch into respective secondary feedback lines 318, 320, 322, and 324 and respective secondary return lines 326, 328, 330, and 332.

The secondary feedback lines 318, 320, 322, and 324 extend through respective check valves 342, 344, 346, and 348 and join together with a primary feedback line 350 that connects to the tertiary pressure line 280. Shutoff valves 334, 336, 338, and 340 interrupt the secondary feedback lines 318, 320, 322, and 324 to control a recirculation of fluid from the quaternary pressure lines 302, 304, 306, and 308 to the tertiary pressure line 280. The secondary return lines 326, 328, 330, and 332 connect the quaternary pressure lines 302, 304, 306, and 308 to the primary return line 296. Shutoff valves 352, 354, 356, and 358 interrupt the secondary return lines 326, 328, 330, and 332 to control fluid flow from the respective quaternary pressure lines 302, 304, 306, and 308 to the reservoir 264.

Another secondary return line 360 connects the tertiary pressure line 280 to the primary return line 296. An adjustable pressure compensated flow control valve 362, hereinafter referred to as a "modulating valve", interrupts the secondary return line 360 to regulate fluid flow from the tertiary pressure line 280 to the reservoir 264. All ten of the shutoff valves identified in this example are actuated by solenoids but are biased into open positions to protect the fluid flow network against damage accompanying an electrical failure.

The two different gangs of displacers 278 and 286 are used to accommodate a much larger range of fluid flow rates and to adapt my regenerator to different size systems. The first gang of displacers 278 directs a predetermined portion of the fluid flow from fixed displacement pump 260 to the second gang of displacers 286. The remaining fluid flow through the first gang of displacers is divided between the system output line 276 and the reservoir 264. However, any of the fluid that is allowed to pass through the shutoff valves 298 and 300 to the reservoir 264 drives one or both of the displacers "B" or "C" as a motor. The other mechanically connected displacers, including displacer "A", can be driven as pumps for converting fluid power in the return flow into useful work reducing output pressure of the pump 260.

The first gang of displacers 278 is arranged with individual displacers that are sized to divide the fluid flow between the pressure and return lines into increments corresponding to multiples of the fluid flow through displacer "A" to the second gang of displacers 286. For example, the displacers "A", "B", and "C" can be sized in respective proportions: 1, 1, and 2 for dividing the flow into four increments, each covering a different twenty-five percent portion of the flow to the system output line 276. The remaining portions of the flow that are returned to the reservoir 264 are regenerated. The table below shows how the displacers "B" and "C" are operated within the fluid flow network to regenerate power from different proportions of the output flow from the fixed displacement pump 260, where "M" represents "motor" and "P" represents "pump".

| OPERATION | | PERCENT |
|---|---|---|
| B | C | REGENERATED |
| P | P | 0%-25% |
| M | P | 25%-50% |
| P | M | 50%-75% |
| M | M | 75%-100% |

Up to twenty-five percent of the fluid flow in the secondary pressure line 272 can also be regenerated by the second gang of displacers 286, and this accounts for the twenty-five percent range associated with each of the listed operating states of the displacers "B" and "C". Within each twenty-five percent range, the displacer "A" operates as either a pump or a motor depending upon pressure differences between the secondary pressure line 272 and the tertiary pressure line 280.

For example, when both of the shutoff valves 298 and 300 are closed, limiting operation of the displacers "B" and "C" as pumps, any of the flow regenerated by the second gang of displacers 286 lowers pressure in the tertiary pressure line 280 with respect to the secondary pressure line 272 and drives displacer "A" as a motor. The displacers "B" and "C" are driven by the displacer "A" as pumps for proportionally lowering the pressure in the secondary pressure line 272 as well as the primary pressure line 268.

In contrast, when one or the other of the shutoff valves 298 and 300 is open for operating one of the respective displacers "B" and "C" as a motor, the pressure in the tertiary pressure line 280 can be more or less than the pressure in the secondary pressure line 272. This relative pressure fluctuation relates to the amount of regeneration practiced by the second gang of displacers 286. Accordingly, the displacer "A" can be operated either as a pump for decreasing pressure in the secondary pressure line 272 or as a motor for helping to drive one of the other displacers "B" and "C" as a pump. However, when the shutoff valves 298 and 300 are open for operating both of the displacers "B" and "C" as motors, the displacer "A" is driven as a pump for reducing pressure in the secondary pressure line 272 with respect to the pressure in the tertiary pressure line 280.

However, unless at least one displacer of either gang of displacers 278 or 286 operates as a motor, the fluid flow from the fixed displacement pump by-passes both gangs of displacers along secondary pressure line 270 as a path of least resistance. However, if either of the gangs of displacers is operated for regenerating a portion of the fluid flow (i.e., at least one of the displacers is used as a motor), then the output pressure of the fixed displacement pump 260 is reduced with respect to the pressure in the system output line 276. Check valve 274 prevents backflow from the system output line 276 to the reduced pressure output flow of the fixed displacement pump 260.

The second gang of displacers 286 is arranged to further divide a portion of the fluid flow in tertiary pressure line 280 into finer increments. Output flows from each of the displacers "a", "b", "c", and "d" can be directed to the system output line 276, combined with the fluid flow in the tertiary pressure line 280, or returned to the reservoir 264. The displacers whose output flow is returned to the reservoir function as motors; the displacers whose output flow is combined with the flow in the tertiary pressure line 280 function as recirculators; and the remaining displacers whose output flow is directed to the system output line function as pumps. The displacers operating as motors provide mechanical power for driving other of the displacers as pumps. The displacers operating as recirculators require the remaining displacers to accommodate larger proportions of the fluid flow in the tertiary pressure line 280.

The displacers are sized to divide the fluid flow in the tertiary pressure line 280 into even increments that number more than the displacers. For example, the displacers "a", "b", "c", and "d" can be sized in respective proportions: 1, 3, 6, and 10 for dividing the fluid flow in tertiary pressure line 280 into twenty increments, each covering a different five percent interval of the flow. However, five percent of the flow in tertiary pressure line 280 actually corresponds to one and one-quarter percent of the output flow from the fixed displacement pump 260 (i.e., five percent of twenty-five percent). Thus, the two gangs of displacers operating together divide the fluid flowing through my regenerator into eighty parts (i.e., twenty times four).

The following table shows how the displacers "a", "b", "c", and "d" are operated within the fluid flow network to regenerate different proportions of the fluid flow in the tertiary pressure line 280, where "M" represents "motor", "P" represents "pump", and "R" represents "recirculator".

| OPERATION | | | | PERCENT |
|---|---|---|---|---|
| a | b | c | d | REGENERATED |
| M | P | P | P | 5% |
| M | P | P | R | 10% |
| P | M | P | P | 15% |
| M | M | P | P | 20% |
| M | P | R | R | 25% |
| P | P | M | P | 30% |
| M | P | M | P | 35% |
| M | M | P | R | 40% |
| P | M | M | P | 45% |
| M | M | M | P | 50% |
| M | P | P | M | 55% |
| P | P | M | R | 60% |
| P | M | P | M | 65% |
| M | M | P | M | 70% |
| P | M | R | R | 75% |
| P | P | M | M | 80% |
| M | P | M | M | 85% |
| P | M | M | R | 90% |
| P | M | M | M | 95% |

None (zero percent) of the flow through tertiary pressure line 280 is regenerated by closing all of the shutoff valves 352, 354, 356, and 358 in the respective secondary return lines 326, 328, 330, and 332. The fluid flow passes through the displacers "a", "b", "c", and "d" without any change in pressure to the system output line 276. Alternatively, all of the fluid flowing in the tertiary pressure line 280 can be directed through the secondary return lines 326, 328, 330, and 332, which collectively exhaust displacer "A" of the first group of displacers 278 to the reservoir 264; and this has the effect of regenerating all (one hundred percent) of the flow in the tertiary pressure line 280.

The modulating valve 362 interrupting the secondary return line 360 is used to more exactly control the flow rate in the system output line 276 that is required to maintain a desired system pressure. In other words, desired flow rates that fall between the one and one-quarter percent increments provided by controlling fluid flow through the two gangs of displacers 278 and 286 are achieved by exhausting very small portions of the fluid flow (i.e., portions less than the one and one-quarter percent) to the reservoir 264. The corresponding energy losses are also very small, but are made even smaller by exhausting fluid from the tertiary pressure line 280 through the secondary return line 360 to the reservoir 264.

For instance, pressure in the tertiary pressure line 280 varies between zero and system pressure depending upon the percent of the flow in the tertiary line 280 that is subsequently exhausted through the secondary return lines 326, 328, 330, and 332 to the reservoir 264. Accordingly, the average pressure in the tertiary pressure line 280 is expected to be about one-half of the system pressure. Thus, the average energy loss accompanying fluid flow through the modulating valve 362 is also reduced by one-half with respect to energy loss associated with exhausting the same volume of fluid at the system pressure.

Figure 6:
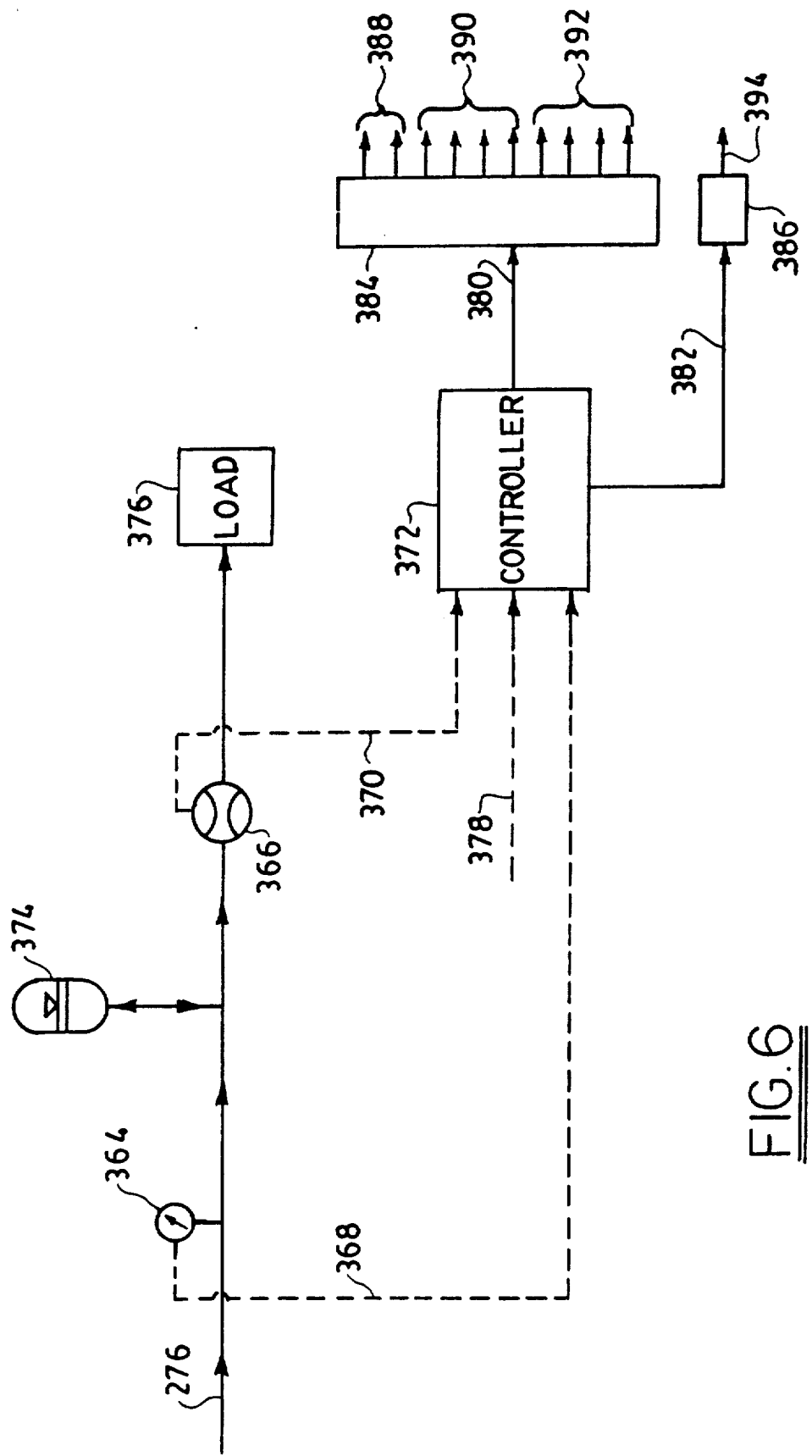
FIG. 6 is a diagram of a novel electronic control system specially adapted to the embodiment of FIG. 5.
Figure 7:
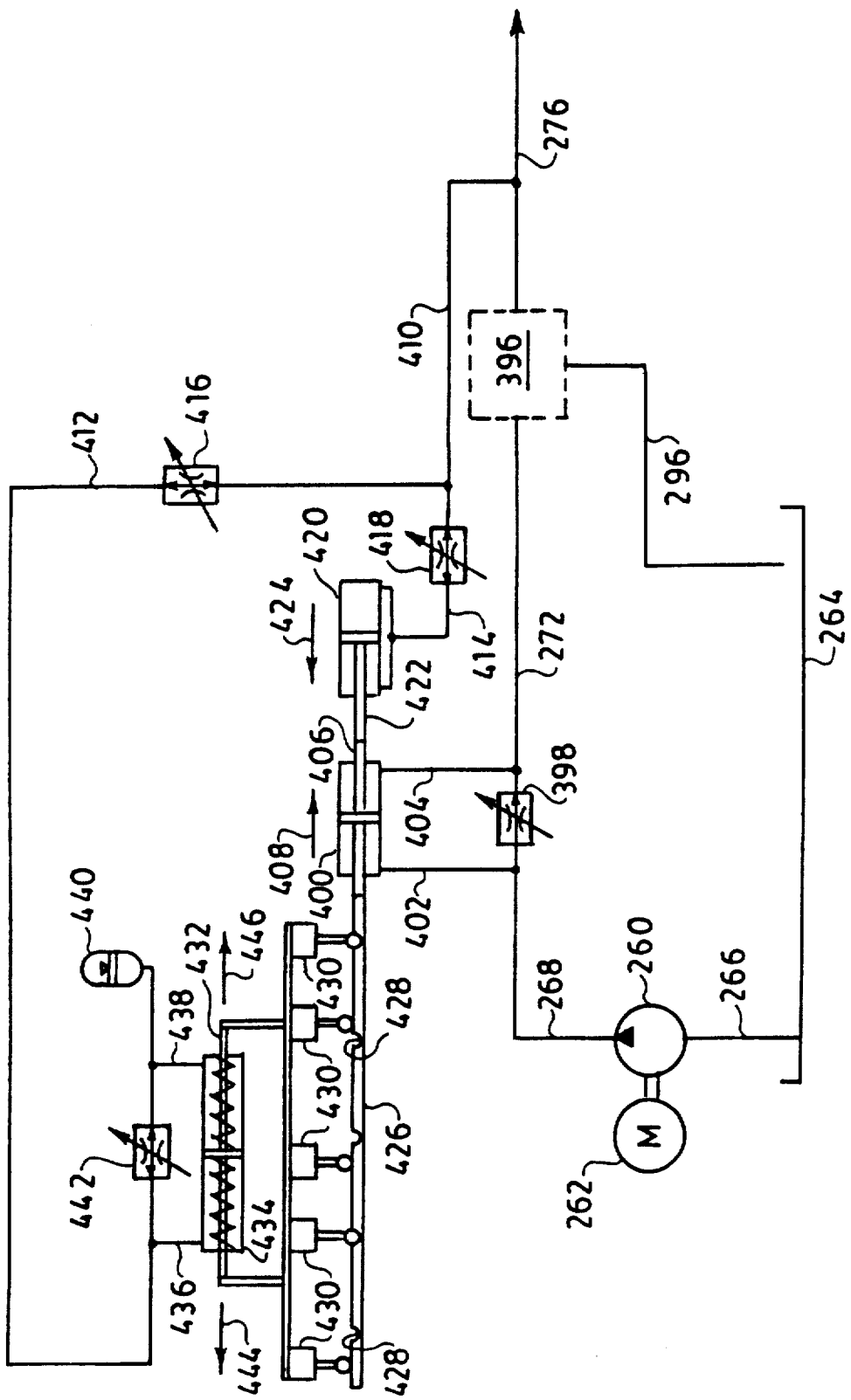
FIG. 7 is a diagram of a novel fluid-powered control system specially adapted to the embodiment of FIG. 5.

FIGS. 6 and 7 depict details of two special control systems that are arranged to control the operation of my regenerator shown in FIG. 5. More particularly, FIG. 6 depicts details of an electronic control system that senses both pressure and flow rate in the system output line 276 (shown also in FIG. 5) and responds to changes in the sensed conditions by actuating various combinations of the ten shutoff valves shown in FIG. 5 and by regulating operation of the modulating valve 362 shown in the same figure.

A pressure sensor 364 and a flow rate sensor 366 connect to the system output line 276 and deliver respective signals 368 and 370 to a programmable controller 372 that is preferably arranged as a so-called "proportional integral derivative controller". The signals 368 and 370 allow the programmable controller 372 to monitor pressure and flow rate in the system output line 276. An accumulator 374, charged with fluid at system pressure, momentarily compensates for any change in the flow rate required to satisfy a demand of a load 376 that is supplied with fluid at the system pressure.

Each of the incremental divisions at which my regenerator is set corresponds to a different percentage of a predetermined flow rate from the fixed displacement pump 260 (shown in FIG. 5). The modulating valve 362 is set to regulate flow rates between each of the incremental divisions. This information, along with a desired or "set point" system pressure, is input to the programmable controller 372 by an input signal 378. The programmable controller 372 periodically compares the monitored flow rate with a flow rate at which my regenerator is set and, based on a difference between these two values, determines a new setting of my regenerator to exactly match the monitored flow rate.

Control signals 380 and 382 communicate the new setting of my regenerator to respective drivers 384 and 386 for the ten shutoff valves and the modulating valve 362. The driver 384 includes a sequence decoder for translating the output signal 380 into individual open or closed settings of each of the shutoff valves. A first group of output signals 388 from the driver 384 controls the solenoid actuation of shutoff valves 298 and 300 in the secondary return lines from the displacers "B" and "C". A second group of output signals 390 controls the solenoid actuation of shutoff valves 352, 354, 356, and 358 in the secondary return lines from the displacers "a", "b", "c", and "d". A third group of output signals 392 controls the solenoid actuation of shutoff valves 334, 336, 338, and 340 in the feedback lines from the same displacers "a", "b", "c", and "d". In addition, output signal 394 from the driver 386 controls operation of the modulating valve 362 for more closely matching the output flow from my regenerator to the monitored flow rate demand momentarily accommodated by the accumulator 374.

Although my regenerator is arranged to closely match the flow rate demand of the load 376, small differences between the actual and the demanded flow rates tend to accumulate in the form of a change in the system pressure. In other words, the system pressure can drift either above or below the set point pressure. However, the programmable controller monitors the pressure in the system output line 276 and compares the monitored pressure with the set point pressure to determine an appropriate remedial change in the regenerator settings for limiting such deviations in the system pressure. The remedial changes in settings are superimposed upon the settings that are determined to satisfy the demanded flow rate and are generally made by merely adjusting the setting of the remedial valve.

Thus, instead of merely reacting to changes in system pressure, my electronic control system reacts primarily to changes in demanded flow rate for greatly reducing the fluctuations in system pressure requiring further correction. Also, the control system provides for making large changes in flow rate to accommodate sudden changes in flow demand with little or no change to the system pressure.

An alternative fluid powered control system is depicted in FIG. 7 for controlling the operation of my regenerator shown in FIG. 5. The fluid powered control system requires several different connections to the pumping system, and these connections are illustrated by showing details of the pumping system including the location of the fluid flow network 396 of my regenerator.

The fixed displacement pump 260 powered by the prime mover 262 draws fluid from the reservoir 264 through intake line 266 and outputs the fluid at a fixed flow rate through primary pressure line 268 and secondary pressure line 272. An adjustable flow control valve, hereinafter referred to as a "flow restricting valve", is adjusted to produce a small amount of backpressure against the fixed displacement pump. Differential pressure across the flow restricting valve 398 is communicated to a double-acting cylinder 400 by pressure control lines 402 and 404 and urges the cylinder plunger together with double-ended rod 406 in the direction of arrow 408.

A control line 410 connected to the system output line 276 branches into flow control line 412 and pressure control line 414. Flow restricting valve 416 in the flow control line 412 is adjusted with respect to flow restricting valve 418 in the pressure control line 414 to offer slightly less resistance to fluid flow. The pressure control line 414 connects to opposite ends of a double-acting cylinder 420 having a plunger with a single end rod 422 that is connected to the double-ended rod 406 of double-acting cylinder 400. The single end rod 422 effectively reduces area on one side of its attached plunger, and this produces a differential force that urges the plunger and the single end rod 422 in the direction of arrow 424.

A rack 426 having a number of detents 428 is also attached to the double-ended rod 406 so that the rack 426 moves together with both rods 406 and 422. The two double-acting cylinders are sized to exert linear forces with their respective rod ends that counteract each other when fluid in the system output line 276 is at the system set point pressure. However, if the system pressure decreases below the set point pressure, the force exerted by the double-acting cylinder 400 prevails, and the rack 426 is moved in the direction of arrow 408. Conversely, if the system pressure increases above the set point pressure, the force exerted by the double-acting cylinder 420 prevails, and the rack 426 is moved in the direction of arrow 424.

Movement of the rack 426 in either direction operates a set of pilot valves 430 that are used to selectively actuate the shutoff valves shown in FIG. 5. (Although depicted with solenoid actuators, the shutoff valves can also be made with conventional pressure-responsive actuators that can be controlled by pilot valves.) Although only five pilot valves 430 are depicted in FIG. 7, the number of pilot valves is intended to match the number of shutoff valves used in my regenerator. The detents 428 are spaced in the rack 426 with respect to the pilot valves 430 to progressively increase or decrease flow rate through my regenerator in response to relative movement of the rack 426 in opposite directions. The excess flow drains to the reservoir 264 through primary return line 296.

The pilot valves are carried from opposite ends of double-ended rod 432 of a spring-centered, double-acting cylinder 434. Secondary flow control lines 436 and 438 connect opposite ends of the double-acting cylinder 434 to flow control line 412, which terminates at an accumulator 440 charged with fluid at the system pressure. A flow restricting valve 442 is adjusted to permit small rates of fluid flow to and from the accumulator to pass without significant resistance. However, larger rates of flow to and from the accumulator are restricted, producing differential pressures at the opposite ends of the double-acting cylinder 434. Increases in flow demand move the double-ended rod 432 together with the pilot valves 430 in the direction of arrow 444, whereas decreases in flow demand move the double-ended rod 432 together with the pilot valves 430 in the direction of arrow 446. Although sensitive to changes in flow rate rather than pressure, these relative movements of the pilot valves 430 with respect to the rack 426 also provide for controlling operation of the shutoff valves to progressively increase or decrease flow rate through my regenerator.

The flow restricting valves 416 and 418 control sensitivity of the control system between changes in flow rate and pressure. Preferably, the flow restricting valve 418 offers more resistance to fluid flow than the flow restricting valve 416 so that the system reacts more quickly to changes in flow rate. However, changes in flow rate and pressure produce compound movement between the pilot valves 430 and the rack 426, and this compound movement further decreases reaction time of the control system.

More generally, my regenerator is controlled to divide a flow of fluid into two relatively variable sized portions. One portion is sized to satisfy a particular demand for fluid flow, and the remaining portion of the flow is converted into useful work. The division of flow can be used to replace the functions of valves or other devices for regulating pressure or flow rate. Available fluid power that is not required to satisfy a particular demand for a given pressure or flow rate is first transformed into mechanical power by driving one or more of a gang of displacers as a motor. The mechanical power generated by the displacers operating as motors is used to drive other of the displacers as pumps. The displacers operating as pumps accomplish useful work either by reducing differential pressure across a primary pump driven by a prime mover or by contributing an additional flow of fluid.

A first regenerator configured for use in a fluid pumping system can also be used together with a second regenerator configured for use with a fluid actuating system. This saves energy throughout fluid power systems. Also, the gangs of displacers of my regenerators that are used in conjunction with fixed displacement pumps and motors can also be provided with separately accessible inputs to their individual displacers similar to my regenerators that can be used in place of variable displacement pumps and motors. In this way, displacers operating as motors can be used to subtract from the output of displacers operating as pumps to provide further divisions of the fluid flow through the gangs of displacers. My regenerator can also be constructed as an integrated circuit by forming the lines of the fluid flow network as passages in an integral block of material.

The selectable flow paths of the fluid flow network are preferably limited to a common direction through the displacers so that the displacers can be rotated in unison. The displacers of each gang are also preferably made as gear drives having one gear member of each drive coupled to a common shaft. The different proportions into which the gear drives divide the flow of fluid relate to relative face widths of the respective gear members of the drives. The gear drives are preferred because they are very rugged and reliable. However, other fixed displacement devices including vane and piston drives could be used in place of the gear drives.

My regenerator is expected to be especially useful for improving efficiencies of so-called "mobile hydraulic" units powered by vehicle engines. For example, my regenerator can provide substantial power savings in fluid power systems for steering vehicles or lifting implements.

I claim:

1. A regenerator for use in a system having a fluid power actuator that receives a flow of fluid under pressure from a pressure line comprising:
    first and second displacers that are mechanically interconnected with each other independently of the fluid power actuator and have an input port and respective output ports;

an exhaust line for connecting an output port of the fluid power actuator to said input port of said first and second displacers;

said first and second displacers providing for dividing the flow of fluid in said exhaust line into predetermined proportions;

a return line for connecting said output ports of said first and second displacers to a low pressure store of the fluid;

a feedback line for connecting said output port of the first displacer to one of the pressure line and a power beyond circuit;

a first valve for alternatively connecting said output port of the first displacer to one of said return line and said feedback line;

a sensor for monitoring changes in a demand for fluid power by the fluid power actuator; and a control system responsive to a decreased demand for fluid power by connecting said output port of the first displacer to said feedback line and said output port of the second displacer to said return line.

2. The regenerator of claim 1 in which said control system provides for operating said first displacer as a pump and said second displacer as a motor for converting back pressure in said exhaust line into useful work.

3. The regenerator of claim 2 further comprising a second valve operated by said control system for adjusting a rate of fluid flow between the pressure line and said exhaust line.

4. The regenerator of claim 3 in which said sensor provides for monitoring a differential pressure between the pressure line and said exhaust line.

5. The regenerator of claim 4 in which said control system provides for maintaining a relatively constant differential pressure between the pressure line and said exhaust line.

6. The regenerator of claim 3 in which said sensor provides for monitoring the rate of fluid flow between the pressure line and said exhaust line.

7. The regenerator of claim 6 in which said control system provides for maintaining a relatively constant rate of fluid flow between the pressure line and said exhaust line.

8. The regenerator of claim 3 in which a second return line provides for connecting said exhaust line to the low pressure store of the fluid and said modulating valve interrupts said second return line.

9. A fluid actuating system comprising:

a store of low pressure fluid;

a supply of high pressure fluid;

a power beyond circuit for delivering high pressure fluid to another fluid actuating system;

an actuator operable by a flow of said high pressure fluid for moving a load and having input and output ports;

first and second displacers mechanically interconnected with each other independently of said actuator and having an input port and respective output ports;

a pressure line connecting said input port of the actuator to said supply of high pressure fluid;

an exhaust line connecting said output port of the actuator to said input port of the first and second displacers;

a return line connecting said respective output ports of the first and second displacers to said store of low pressure fluid;

a feedback line connecting said output port of the first displacer to said power beyond circuit; and a valve for alternatively connecting said output port of the first displacer to one of said return line and said feedback line.

10. The system of claim 9 in which said second displacer connecting said exhaust line to said return line is drivable as a motor for driving said first displacer connecting said exhaust line to said feedback line as a pump.

11. The system of claim 10 in which said first displacer provides for delivering pressurized fluid to said power beyond circuit.

12. The system of claim 11 further comprising a sensor for monitoring changes in a demand for fluid power by said actuator and a control system responsive to a decreased demand for fluid power by connecting said output port of the first displacer to said feedback line and said output port of the second displacer to said return line.

13. The system of claim 9 further comprising:

a shut-off valve interrupting said pressure line for closing off the flow of high pressure fluid to said actuator;

an intake line connecting said input port of the actuator to said store of low pressure fluid; and a control system for closing said shut-off valve for enabling said actuator to operate as a pump.

* * * * *